United States Patent
Sinnhuber

Patent Number: 5,290,084
Date of Patent: Mar. 1, 1994

[54] MOTOR VEHICLE SEAT ARRANGEMENT HAVING A SIDE CHEEK MOVABLE BETWEEN A REST POSITION AND AN OPERATING POSITION

[75] Inventor: Ruprecht Sinnhuber, Gifhorn, Fed. Rep. of Germany

[73] Assignee: Volkswagen AG, Wolfsburg, Fed. Rep. of Germany

[21] Appl. No.: 23,936

[22] Filed: Feb. 26, 1993

[30] Foreign Application Priority Data

Mar. 4, 1992 [DE] Fed. Rep. of Germany ........ 4206722

[51] Int. Cl.⁵ .............................................. B60R 21/02
[52] U.S. Cl. ................................ 296/68.1; 280/730 A
[58] Field of Search ................ 296/68.1; 180/274, 282; 280/728, 730 R, 730 A

[56] References Cited

U.S. PATENT DOCUMENTS 5,072,966 12/1991 Nishitake et al. ............. 280/730 A
5,112,079 5/1992 Haland et al. ................. 280/730 A

FOREIGN PATENT DOCUMENTS 0401092 12/1990 European Pat. Off. .
1580621 9/1970 Fed. Rep. of Germany .
3643876 6/1988 Fed. Rep. of Germany .
3-281455 12/1991 Japan .............................. 280/730 A Primary Examiner—Robert R. Song
Attorney, Agent, or Firm—Brumbaugh, Graves, Donohue & Raymond

[57] ABSTRACT

To protect a vehicle occupant in a side collision without inconvenience to an occupant in getting in and out of the vehicle, a vehicle seat includes a side cheek member adjacent to a side wall of the vehicle and the outer surface of the side cheek member is arranged so that inward penetration of the side wall of the vehicle in a side collision will force the side cheek member in the direction of increasing penetration into the space between a vehicle occupant and the outside wall of the vehicle.

7 Claims, 2 Drawing Sheets

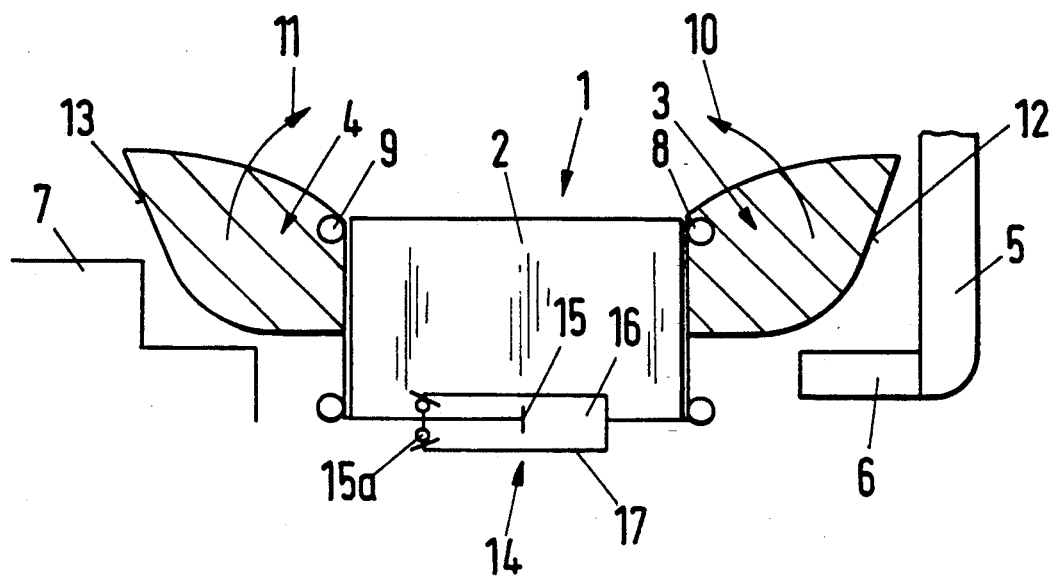

MOTOR VEHICLE SEAT ARRANGEMENT HAVING A SIDE CHEEK MOVABLE BETWEEN A REST POSITION AND AN OPERATING POSITION

BACKGROUND OF THE INVENTION

This invention relates to motor vehicle seat arrangements having movable side cheeks.

Conventional motor vehicle seats have side cheeks which are components of the sitting parts of the vehicle seat and, to facilitate getting in and out of the vehicle by the occupants, they can be retracted to a rest position, whereas during vehicle operation they can be moved into their operating position in which they occupy a place adjacent to the occupant to provide lateral support for the occupant. German Offenlegungsschrift No. 1 580 621 describes a motor vehicle seat having side cheeks which are movable manually between their two positions, and the seat described in German Offenlegungsschrift No. 36 43 876 includes side cheeks which are coupled in motion with an adjacent vehicle door. The seat arrangement according to European Patent No. 0 401 092 causes movement of the side cheeks from the rest position into an operating position in response to transverse accelerations occurring on curves.

These conventional seat configurations do not take into account the situation that arises in the case of a side collision to the vehicle. As is known, side collisions are especially dangerous to vehicle occupants because, in the region of the side walls, including the side doors of the vehicle, there is insufficient room for deformation travel of deformable parts to absorb energy in comparison to the front and rear regions of the vehicle. In a side collision of sufficient severity, therefore, it must be anticipated that the side wall of the vehicle will be forced into the passenger compartment against the occupants sitting near it.

SUMMARY OF THE INVENTION

Accordingly, it is an object of the present invention to provide a motor vehicle seat with a movable cheek arrangement which overcomes the disadvantages of the prior art.

Another object of the invention is to provide a motor vehicle seat arrangement in which a movable side cheek can assist in protecting the occupant of the seat from dangerous contact with the adjacent side wall of the vehicle in a side collision.

These and other objects of the invention are attained by providing a cheek for a motor vehicle seat which is inclined so that, during a side collision, the cheek is moved by collision-related penetration of the adjacent side wall of the vehicle into a position in which it is disposed substantially between the occupant and the side wall of the vehicle.

In one embodiment, the cheek on the side of the seat away from the adjacent side wall of the vehicle is inclined with respect to the tunnel in the center of the vehicle so that it is moved by the tunnel during a side collision into a position substantially between the occupant of the seat and the tunnel, thereby supporting the occupant in the direction toward the central longitudinal plane of the vehicle.

If desired, the cheeks may be actuated toward their occupant-protective positions by a collision initiated triggering device which, after its actuation, forms an additional transverse reinforcement of the vehicle between the central tunnel and the side door sill.

Understandably, the invention is especially effective if the occupant is restrained by a safety belt having a belt tightener which is activated in side collisions.

BRIEF DESCRIPTION OF THE DRAWINGS

Further objects and advantages of the invention will be apparent from a reading of the following description in conjunction with the accompanying drawings, in which:

FIG. 1 is a schematic fragmentary vertical sectional view of a motor vehicle showing a representative seat arrangement in accordance with the invention;

FIG. 2 is a view similar to FIG. 1 showing another embodiment of the invention.

DESCRIPTION OF PREFERRED EMBODIMENTS

Figure 3:
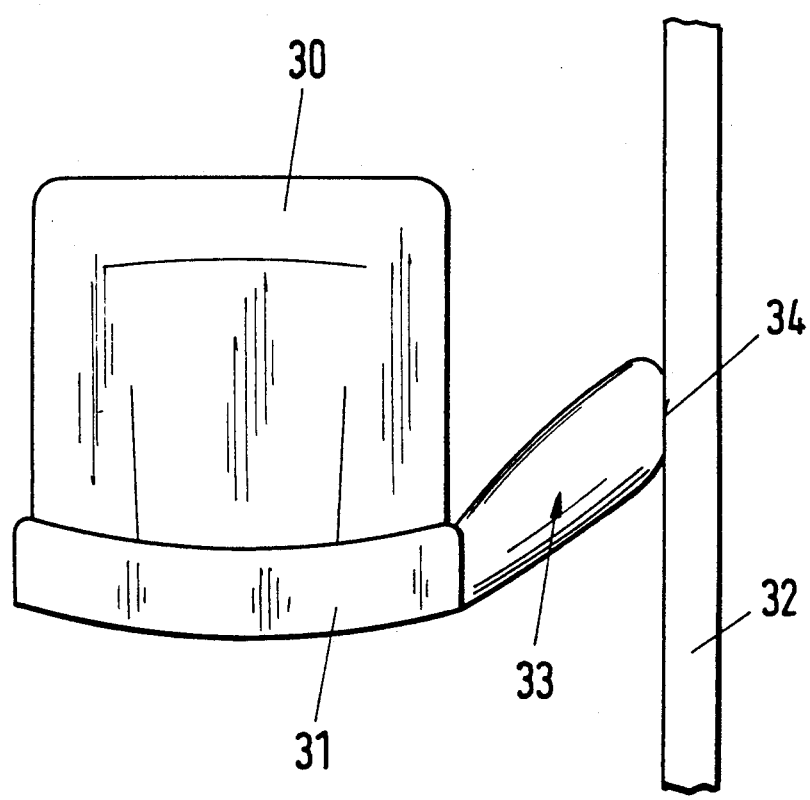
FIG. 3 is a horizontal view of still another embodiment of the invention.

While the description herein of the embodiments of the invention primarily relates to seats in which the side cheeks are components of the seat part rather than the backrest, it will be understood that the invention also extends to side cheek components of a backrest which are capable of being adjusted obliquely forward into an operating position. While side cheeks provided as components of the seat part serve essentially to protect the pelvis of the passenger occupying the seat, side cheeks provided as backrest components can also serve to protect the chest region and optionally also the head region of the vehicle occupant in a side collision.

In the typical embodiment shown in FIG. 1, only the seat part 1 of the vehicle seat is illustrated, with a midportion 2 mounted on the vehicle floor in a conventional manner and normally displaceable in the lengthwise direction, along with two side cheeks 3 and 4. In FIG. 1, the two side cheeks 3 and 4 are illustrated in their rest position, i.e., in their lowered position, in which the side cheek 3 allows an occupant to get in and out of the seat when the adjacent vehicle door 5 is opened. The door sill 6 of the vehicle and the central tunnel 7 accommodating the connection between the powerplant in the front of the vehicle and the rear wheels of the vehicle are also shown in FIG. 1.

In this embodiment, the two side cheeks 3 and 4 are swingably mounted on longitudinal axes 8 and 9 for motion in the direction of the arrows 10 and 11 between their rest position as illustrated and an operating position, not shown. The two side cheeks 3 and 4 have outer surfaces 12 and 13, respectively, which are arranged so that the side door 5, when penetrating into the passenger compartment as a result of a collision, acts to swing the side cheek 3 upwardly in the direction of the arrow 10. At the same time, contact of the tunnel 7 with the outer surface 13 of the other side cheek 4, which will occur in the event of a collision-related displacement of the seat portion 1, results in forcing the other side cheek upwardly in the direction of the arrow 11.

This protective effect can be expedited if the two side cheeks 3 and 4 are coupled kinetically to a pyrotechnical triggering device 14, activated by a collision sensor (not shown) which responds, for example, to acceleration or deformation. The triggering device then operates so that a piston 15 is driven outwardly in a cylinder 17 by the gas pressure in a chamber 16, causing the transverse dimension of the device 14 to be enlarged.

This not only produces an upward swinging motion of the two side cheeks 3 and 4 in the direction of the arrows 10 and 11, possibly even before any deformation of the side door 5, but also provides an additional abutment between the door sill 6 and the tunnel 7 in the form of the extended triggering device 14, which is rendered geometrically stable by a restoring lock 15a with ball clamps.

Whereas in the embodiment of FIG. 1 the two side cheeks 3 and 4 constitute "solid bodies", of course with appropriate yieldingness, the embodiment shown in FIG. 2 includes a side cheek 20 next to the door 21 and another side cheek 22 of a seat part 23 disposed in two components 24 and 25 attached to the seat part consisting of corresponding airbags 26 and 27, which are illustrated in FIG. 2 in their expanded condition. The release of the airbags is effected in this embodiment by way of two conventional gas generators 28 and 29, not illustrated in detail, which in turn are triggered by an acceleration or buckling-velocity sensor (not shown). Obviously, a single gas generator could be used instead.

As may be seen immediately from FIG. 2, the two airbags 26 and 27 in their expanded condition extend obliquely outwardly and upwardly in cross-sections of the vehicle, so that they laterally embrace the seat occupant in the region of the thigh and plevis, and the outer surface 30 and of the door side airbag 26 is so shaped that it makes an angle with the plane of the door 21 to ensure that the door, in its collision-related movement of inward penetration (to the left as seen in FIG. 2), will steepen the angle of the airbag 26 so that it will be moved farther upward in the space between the occupant and the penetration of the door 21.

FIG. 3 shows at 30 the seat part and at 31 the backrest of a vehicle seat near a side wall 32 of the vehicle. In this embodiment of the invention an inclined side cheek member 33 with an outer surface 34 abutting the side wall 32 is part of the backrest 31.

The invention thus provides a vehicle seat having side cheeks, either on the seat part or on the backrest or on both, which are actively utilized to protect the occupant in a side collision without the sacrifice of any convenience in getting in and out of the vehicle.

Although the invention has been described herein with reference to specific embodiments, many modifications and variations therein will readily occur to those skilled in the art. Accordingly, all such variations and modifications are included within the intended scope of the invention.

I claim:

1. A motor vehicle having a side wall comprising a seat mounted adjacent to the side wall of the vehicle and including a side cheek member movable between a rest position permitting an occupant of the seat to move out of the seat easily and an operative position in which the cheek is disposed at least partially between an occupant of the seat and a side wall, wherein the cheek member has an outer surface facing the side wall of the vehicle which is inclined with respect to the side wall of the vehicle so that the side wall, when forced against the cheek member during a side collision, exerts a moment on the cheek member to force it in the direction toward its operative position.

2. A motor vehicle according to claim 1 wherein the motor vehicle includes a central tunnel and the seat includes an additional side cheek member adjacent to the tunnel and movable out of a rest position laterally releasing the occupant into an operating position laterally restraining the occupant, and wherein the additional side cheek member has an outer surface inclined with respect to the central tunnel so that, in the event a side collision-imposed force produces engagement between the additional side cheek member and the tunnel, the tunnel will exert a moment on the additional side cheek member in the direction toward its operating position.

3. A motor vehicle according to claim 1 wherein the side cheek member is a component of the sitting part of the seat.

4. A motor vehicle according to claim 1 wherein the side cheek member is a component of the backrest of the seat.

5. A motor vehicle according to claim 1 including triggering means comprising a collision sensor for moving the side cheek member into its operating position in a side collision.

6. A motor vehicle according to claim 5 wherein the vehicle includes a door sill and a central tunnel member and the seat includes an additional side cheek member adjacent to the central tunnel and wherein the triggering means comprises a piston-and-cylinder arrangement which extends transversely between the central tunnel and the door sill and is provided with a restoring lock and which expands transversely when actuated, and which is in swinging connection with the movably mounted side cheek members.

7. A motor vehicle according to claim 1 wherein the side cheek member contains an airbag which, when released, will expand obliquely outward to abut the side wall of the vehicle.

* * * * *